US006813700B2

(12) United States Patent
Fallah et al.

(10) Patent No.: US 6,813,700 B2
(45) Date of Patent: Nov. 2, 2004

(54) REDUCTION OF BUS SWITCHING ACTIVITY USING AN ENCODER AND DECODER

(75) Inventors: Farzan Fallah, San Jose, CA (US); Yazdan Aghaghiri, Los Angeles, CA (US); Massoud Pedram, Los Angeles, CA (US)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 10/162,010

(22) Filed: Jun. 3, 2002

(65) Prior Publication Data

US 2002/0194453 A1 Dec. 19, 2002

Related U.S. Application Data

(60) Provisional application No. 60/297,614, filed on Jun. 11, 2001.

(51) Int. Cl.[7] ............................................. G06F 12/00
(52) U.S. Cl. ........................ 711/220; 711/221; 341/106
(58) Field of Search ................................. 711/219, 220, 711/202, 204, 211, 213, 218, 221, 217; 713/300–340; 341/76, 106, 97, 98

(56) References Cited

U.S. PATENT DOCUMENTS

2002/0019896 A1 * 2/2002 Fornaciari et al. .......... 710/100

OTHER PUBLICATIONS

Bennini, et al., "Asymptotic Zero–Transition Activity Encoding for Address Buesses in Low Power Microprocessor–Based Systems," IEEE, pp. 77–82, 1066–1395/97, 1997.*
Stan, et al., "Coding a Terminated Bus for Low Power," IEEE, pp. 70–73, 1066–1395/95, 1995.*
Cheng, et al., "Memory Bus Encoding for Low Power: A Tutorial," IEEE, pp. 199–204, 0–7695–1025–6/01, 2001.*
Musoll, et al., "Working–Zone Encoding for Reducing the Energy in Microprocessor Address Buses," IEEE, pp. 568–572, 1063–8210/98, 1998.*
Tiehan, et al., "A Dictionary–Based En/Decoding Scheme for Low–Power Data Buses," IEEE, pp. 943–951, 1063–8210/03, 2003.*
Komatsu, et al., "Irredundant Address Bus Encoding Techniques based on Adaptive Codebooks for Low Power," IEEE, pp. 9–14, 0–7803–7659–5/03, 2003.*
Fornaciari, et al., *Power Optimization of System–Level Address Buses Based on Software Profiling* (pp. 29–33), ©2000 *ACM* 2000 1–58113–268–9/00/5, 2000.
Benini, et al., *System–Level Power Optimization of Special Purpose Applications: The Beach Solution* (pp. 24–29), ©1997 *ACM* 0–89791–903–3/97/08, 1997.
Ramprasa, et al., *A Coding Framework for Low–Power Address and Data Busses* (pp. 1–10), ©1997, 1998, *IEEE Transactions on VLSI Systems*, 1998/.
Stan, et al., *Low–Power Encodings for Global Communication in CMOS VLSI* (pp. 1–24), *Transactions on VLSI*, Mar. 26, 1997.
Komatsu, et al., *Low Power Chip Interface Based on Bus Data Encoding with Adaptive Code–book Method* (pp. 1–4).
Stan, et al., *Bus–Invert Coding for Low Power I/O* (pp. 100–108), *IEEE Transactions on VLSI*, 1999.
Musoll, et al., *Exploiting the Locality of Memory References to Reduce the Address Bus Energy* (6 pages), *CICYT Grant TIC 95–0419*, 1995.
Benini, et al., *Address Bus Encoding Techniques for System–Level Power Optimization* (6 pages).
Benini, et al., *Asymptotic Zero–Transition Activity Encoding for Address Busses in Low–Power Microprocessor–Based Systems* (pp. 77–82), 1066–1395/97 ©1997 IEEE.

* cited by examiner

*Primary Examiner*—Matthew Kim
*Assistant Examiner*—Shane Thomas
(74) *Attorney, Agent, or Firm*—Baker Botts L.L.P.

(57) ABSTRACT

An encoder and decoder provide coding of information communicated on busses. The encoder and decoder may use various combinations of techniques to reduce switching activity on an address bus.

30 Claims, 4 Drawing Sheets

REDUCTION OF BUS SWITCHING ACTIVITY USING AN ENCODER AND DECODER

RELATED PATENT APPLICATIONS

The present invention claims priority to U.S. Provisional Patent Application Ser. No. 60/297,614 filed Jun. 11, 2001, entitled *Alborz: Address Level Bus Power Optimization*, which is hereby incorporated by reference.

TECHNICAL FIELD OF THE INVENTION

The present invention relates generally to circuit design and, more particularly, to reduction of bus switching activity.

BACKGROUND OF THE INVENTION

Power concerns often drive the designs of circuitry. Circuit designs must account for generated heat and total power requirements, demands that become increasingly challenging as circuits become more compact, include more elements, and operate at ever higher frequencies. Moreover, mobile devices typically rely on batteries with limited charges. Therefore, reduced power use corresponds to longer availability of devices between charges.

SUMMARY OF THE INVENTION

In accordance with the present invention, techniques for reducing bus switching activity are provided. According to particular embodiments, these techniques reduce power consumption of electronic devices.

According to a particular embodiment, a method for reducing switching activity on a bus maintains a current value on an address bus if a target address is sequential. The method encodes the target address on the address bus if the target address is not sequential and if the target address is not equal to the current value on the address bus. The method sends a sequential address (the sum of the previous target address plus a constant) on the address bus if the target address is equal to the current value on the address bus.

According to another embodiment, a method for reducing switching activity on a bus receives a target address for communication to a memory on an address bus. The method determines an offset between the target address and a previous target address, inverts selected bits of the offset if the offset is negative, and performs an exclusive-or operation between the offset and a previous coded offset sent on the address bus. The method further sends a result of the exclusive-or operation on the address bus.

According to another embodiment, a method for reducing switching activity on a bus receives a target address for communication to a memory on an address bus. The method determines an offset between the target address and a previous target address and accesses a limited code book using the offset, the limited code book mapping a plurality of offset entries into a plurality of code entries. If the offset matches one of the offset entries, the method sets a coded offset equal to the one of the code entries corresponding to the matching offset entry. If the offset matches one of the code entries, the method sets the coded offset equal to the one of the offset entries corresponding to the matching code entry. If the offset fails to match one of the offset entries or one of the code entries, the method sets the coded offset equal to the offset. The method performs an exclusive-or operation between the coded offset and a previous coded offset sent on the address bus and sends a result of the exclusive-or operation on the address bus.

Embodiments of the invention provide various technical advantages. These techniques, when appropriately implemented, decrease switching activity of instruction address busses within circuits. This helps achieve two primary goals of circuit design: reduced heat and lower power consumption.

In addition, use of these techniques requires minimal extra circuitry or changes to existing circuit designs. For example, some of the disclosed techniques permit operation without the addition of new control or communication lines. Therefore, these techniques may be implemented using existing boards and circuit elements.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE DRAWINGS

Figure 1:
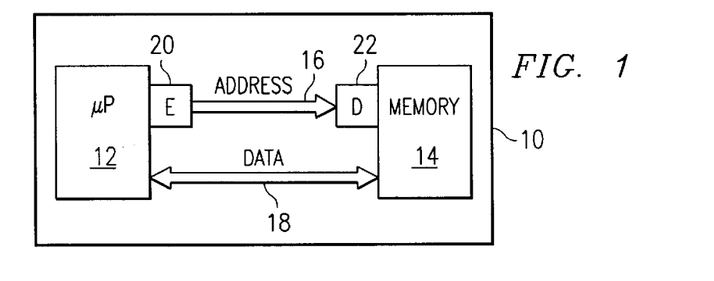
FIG. 1 illustrates a processing system having elements encoding communications sent across busses according to various embodiments of the present invention.

FIG. 1 is a block diagram illustrating a processing system, indicated at 10, that includes a microprocessor 12 and a memory 14 coupled to each other using an address bus 16 and a data bus 18. To reduce switching activity on address bus 16, system 10 includes an encoder 20 that couples between microprocessor 12 and address bus 16 and a decoder 22 that couples between address 16 and memory 14. In general, encoder 20 and decoder 22 reduce switching activity on address bus 16 using one or more encoding techniques.

During operation, microprocessor 12 requests communications of data to and from memory 14 using address bus 16. Microprocessor 12 and memory 14 exchange data on data bus 18 based on the values of address bus 16. Setting values on address bus 16 and data bus 18 uses power, often proportionate to the number of changes in the value of the bus. For example, a change from an address of 00 hex to FF hex consumes more power than a change from 00 hex to 01 hex. Thus, reducing changes between consecutive settings on a bus reduces switching activity and can reduce power consumption of the bus. Within systems, busses typically use more power than other elements. Because of this, the elements introduced to reduce switching activity can use significantly less power than is saved from the reduction in switching activity resulting from the elements. Therefore, the addition of encoder 20 and decoder 22 can produce a net decrease in power consumption of system 10 by reducing switching activity on address bus 16.

To reduce switching activity on address bus 16, encoder 20 and decoder 22 use one or more techniques designed to reduce changes in consecutive values communicated on address bus 16. According to particular embodiments, encoder 20 and decoder 22 exploit the predictable nature of address requests in certain applications. In some applications, microprocessor 12 will often request many blocks of data using sequential address requests. For example, during execution of a program, process flow generally moves sequentially from instruction to instruction unless a branch or similar instruction occurs. Thus when requesting instructions from memory 14, microprocessor 12 often generates a sequence of address requests, with each request equal to the previous value incremented by some constant, such as 1. Similarly, data requests accessing blocks of information can also result in a significant strings of sequential addresses. Thus, encoder 20 and decoder 22 may exploit the highly predictable behavior of microprocessor 12, yet must still accommodate the response of microprocessor 12 to branches, jumps, data requests, and/or other events that result in nonsequential addressing. Particular embodiments of encoder 20 leverage the sequential nature of target addresses generated by microprocessor 12 into reduced switching activity on address bus 16.

In a particular embodiment, encoder 20 implements a policy that freezes the value of address bus 16 so long as target addresses remain sequential. For example, given an initial address value of 05 and subsequent address values of 06, 07, and 08, encoder 20 will initially send 05 on address bus 16 and will then maintain the value of 05 on address bus 16 instead of sending 06, 07, or 08. So long as system 10 is appropriately timed, decoder 22 can interpret the value of 05 on address bus 16 during four time frames to indicate a sequence of addresses beginning with 05. Thus, decoder 22 interprets the frozen state of address bus 16 to indicate address values of 05, 06, 07, and 08. Given a nonsequential address, encoder 20 may simply send the value of the nonsequential address on address bus 16. For example, if after address 08, microprocessor 12 requests address 03, encoder 20 sends 03 on address bus 16. Decoder 22 detects the change on address bus 16 and thus interprets the newly received address.

However, if the nonsequential address requested by microprocessor 12 is equal to the current value frozen on address bus 16, encoder 20 and decoder 22 use an additional technique to indicate this special circumstance. To indicate this condition, encoder 20 sends the value for the sequential address counted from the previous address requested by microprocessor 12. Thus, using our initial example, if microprocessor 12 branches to 05 at the end of the sequence 05, 06, 07, 08, then encoder 20 will send a value of 09 on address bus 16 to indicate this special circumstance. If the address requested by microprocessor 12 had truly been 09, encoder 20 would have simply maintained the current value of 05 on address bus 16. Thus, by sending the value of 09 on address bus 16, encoder 20 informs decoder 22 that the actual target address requested by microprocessor 12 is the address whose value was frozen on address bus 16 previously.

This technique provides a one to one mapping between the value of address bus 16 and any address that may be generated by microprocessor 12. Therefore, this technique can be implemented within circuits without requiring additional control lines to indicate whether particular addresses are or are not being encoded. Thus this technique provides an irredundant scheme for encoding addresses. This permits existing hardware and elements to be upgraded without requiring changes in bus architecture or control lines.

According to particular embodiments, encoder 20 may, alternatively or in addition, use a combination of operations designed to reduce changes in consecutive values on address bus 16. According to a particular embodiment, encoder 20 reduces changes in consecutive address values using a combination of offset encoding, reduction in binary one frequency, and transition signaling. Encoder 20 then sends the result of these operations on address bus 16. For offset encoding, encoder 20 determines an offset between a target address and the previous target address. For example, encoder 20 may subtract the previous address value from the target address value. Encoder 20 may further subtract one from this value, producing an offset value of zero for sequential addresses.

To reduce the frequency of binary ones in determined offsets, encoder 20 relies on the relative predictability of microprocessor operation. In many cases, offsets encountered by microprocessor 12 will be relatively small. Thus for positive offsets, the offset will have relatively few ones (in binary notation). However, for negative offsets, the likelihood that the magnitude of these offsets will be relatively small increases the probability of ones within the determined offset. For example, in two's compliment form, the value for negative one is represented by all ones (e.g., FFFF hex). For negative offsets, encoder 20 reduces the probability of ones in the offset by converting the negative offset into sign/magnitude form or a variation of sign/magnitude form. According to particular embodiments, encoder 20 inverts all bits except for the most significant bit of a negative offset. For example, given an offset of FFFF hex (−1), encoder 20 would modify the offset into 8000 hex. As seen by this example, this can significantly reduce the number of ones in the determined offset using minimal processing.

After generating a coded offset using offset encoding and any appropriate reduction in the frequency of ones, encoder 20 uses transition signaling to send the coded offset on address bus 16. For transition signaling, encoder 20 uses address bus 16 to indicate only the difference between the coded offset and the previous value communicated on address bus 16. For this signaling, encoder 20 performs an exclusive-or operation between the modified offset and the previous value sent on address bus 16. Because of the decorrelating characteristics of the exclusive-or operation, decoder 22 can reverse this exclusive-or operation by performing another exclusive-or operation using the current value on address 16 and the previous value from address bus 16. Decoder 22 can then reverse the encoding process performed by encoder 20. For example, if the offset received on address 16 is greater than or equal to zero, decoder 22 adds the offset and a value of one to the previous address value to determine the target address requested. If the most significant bit of the received offset is one, decoder 22 inverts all except for the most significant bit of the received offset. Decoder 22 then adds this negative value to the previous address to determine the target address requested. Thus, using a relatively small number of operations, encoder 20 and decoder 22 can reduce the switching activity on address 16.

To further reduce switching activity, encoder 20 and decoder 22 may use a code book to further reduce the number of ones in offsets sent on address bus 16. Code books provide a mapping of a first value to a second value, and encoder 20 may use a code book to map values of offsets into coded offsets having a smaller number of ones. These code books may employ any suitable techniques and any appropriate mappings designed to reduce the number of ones in values communicated on address bus 16. For example, encoder 20 may have a code book with an entry that maps an offset value with five ones into a coded offset having only a single one. To appropriately decode the coded offset received, decoder 22 must also include a code book providing a reverse mapping, such that the intended offset can be identified. To implement these code books, encoder 20 and decoder 22 may use any appropriate hardware and/or logic. For example, code book logic may include memory and other circuit elements for mapping offsets into coded offsets. In particular embodiments, code book logic may be implemented using only combinational logic devices having no memory elements. Thus one of skill in the art will appreciate that any number and type of code book technologies may be implemented within encoder 20 and decoder 22.

According to particular embodiments, encoder 20 uses an embedded k-bit code book, which converts a k-bit source word into a k-bit code word. For example, given a 64 bit value, a 64 bit code book will convert the entire value into a 64 bit code word. However, a code book need not map all bits of an offset. For example, given a 64 bit offset and a 10 bit code book, encoder 20 may use the code book to convert only the ten least significant bits of the offset. Since the most significant bits of offsets often remain fairly constant, code books mapping only a portion of offsets and/or addresses can be effective in reducing the frequency of ones while requiring less hardware and processing overhead.

According to particular embodiments, encoder 20 includes a code book that maps offsets occurring with high frequencies to limited weight codes with few ones. For example, given a 10-bit code book, the first ten most commonly occurring offsets may be assigned code values of 1, 2, 4, 8, 16, 32, 64, 128, 256, and 512. This maps these commonly occurring offsets to code words having a single one. The next 45 entries in the code book map to code words having exactly two ones (e.g., 3, 5, . . . ). In this fashion, the code book maps source values into limited weight coded values and reduces the probability of ones in coded values, which decreases switching activity on address bus 16.

To reduce the number of entries within code books, encoder 20 and decoder 22 may use code books that map the least significant bits of numbers that are compliments of each other to the same code words. For example, in sign/magnitude form, 10 and −10 each have the same magnitude, with the sign bit being the only difference between these two values. Thus if values are in sign/magnitude form, encoder 20 and decoder 22 may use code books that map based purely on magnitudes. As an alternative to "pure" sign/magnitude mapping, encoder 20 and decoder 22 may simply invert the least significant bits of negative numbers before accessing the code book. After encoding the magnitude into a coded magnitude, encoder 20 sends the sign bit and the coded magnitude on address bus 16. This technique reduces the number of entries in the code books by a factor of two, thus significantly reducing hardware overhead of the code book. This technique may be implemented within both full and limited code books.

According to particular embodiments, encoder 20 and decoder 22 implement an irredundant coding scheme that uses a limited code book. A limited code book maps only some of the potential values of a source word into code words. For example, given a 10-bit limited code book having entries for only 1-bit and 2-bit limited weight codes (codes having a single one or two ones), the limited code book will provide mapping for only 55 potential values. To use a limited code book without requiring extra control lines to indicate when coded values are being communicated, encoder 20 implements a technique in which there is a one to one correlation between values for a target address and the values for communication on address bus 16. That is, each target address maps to exactly one value for communication on address bus 16, and each value received by decoder 22 maps to a target address value.

To implement this mapping, encoder 20 first determines an offset between a target address and a previous address. Encoder 20 then uses the offset to access the limited code book. The limited code book can be pictured as a table having two columns, the first column listing offsets and the second column listing corresponding limited weight codes. If the offset matches one of the offsets within the code book, encoder 20 uses the corresponding limited weight code as the code value. If the determined offset matches one of the limited weight codes in the code book, then encoder 20 uses the corresponding offset from the limited code book as the code value. For example, consider a code book entry mapping an offset of 7 to a limited weight code of 1. Given a determined offset of 7, encoder 20 will use a code value of 1. Given a determined offset of 1, encoder 20 will use a code value of 7.

If the determined offset does not match any offsets or codes within the limited code book, encoder 20 uses a code value equal to the determined offset. For example, if an offset of 6 fails to match with any of the offsets or limited weight codes within the limited code book, encoder 20 uses a code value of 6. After determining the appropriate code value, encoder 20 sends the code value on address bus 16 using transition signaling. The use of a limited code book reduces the size of the code book, yet this technique enables the limited code book to be used without requiring additional control lines.

When using a limited code book, system 10 may use any appropriate techniques for populating the mappings within the code book. According to particular embodiments, encoder 20 and decoder 22 may use adaptable code books, in which mappings change over time. For example, encoder 20 and decoder 22 may each use 10 bit code books that enable mappings to 1-bit limited weight code. Thus each code book provides ten potential mappings. At initialization, these ten mappings may be set to map the ten most commonly occurring values or may be set to initially provide no mappings. Upon detecting a value that is not mapped within the adaptable code book, the code book can enforce a replacement policy by which particular mappings are changed to reflect new mappings. For example, each time a new value is detected, the code book may replace its entry that has been unused the longest. However, system 10 contemplates encoder 20 using any appropriate timers, counters, and/or policies to determine appropriate replacements within an adaptable code book. Moreover, adaptable code books can be used in irredundant or redundant schemes. For example, encoder 20 may have a control line to decoder 22 to indicate when an entry from the adaptable code book has been used or should be replaced. Decoder 22 implements a similar policy to that implemented within encoder 20, such that decoder 22 can correctly interpret values received on address bus 16.

The preceding description details a number of techniques for reducing switching activity on address bus 16. While these techniques have been described in particular arrangements and combinations, system 10 contemplates encoder 20 using any appropriate combination and ordering of these operations to provide for decreased switching activity on address bus 16.

Figure 2:
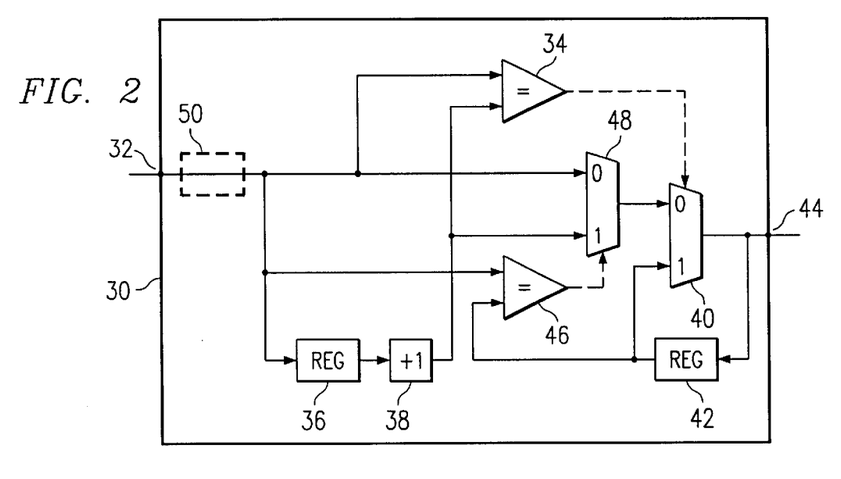
FIG. 2 is a block diagram illustrating a circuit implementing irredundant encoding of address bus signals.

FIG. 2 is a block diagram illustrating an encoder 30 implementing an irredundant coding scheme that leverages the sequential nature of addresses into a reduction of switching activity on address bus 16 by "freezing" address bus 16 during sequential address requests. Encoder 30 receives a target address at an input 32 and determines whether the target address is sequential using a comparator 34. Comparator 34 receives the target address from input 32 as well as the previous target address incremented by a constant, which is provided from a register 36 and an adder 38. In the embodiment illustrated, sequential address values are incremented by a constant of one, thus adder 38 adds a value of one to the previous target address value stored in register 36 and provides this value to comparator 34. Between the comparison between the address received at input 32 and the address provided from adder 38, comparator 34 determines whether the target address is sequential and uses the result of the comparison as control input for a multiplexer 40. If the target address is sequential, comparator 34 will use multiplexer 40 to freeze the value on address bus 16. Encoder 30 maintains this previous value communicated on address bus 16 within a register 42. Therefore, if the target address is sequential, comparator 34 provides control input to multiplexer 40 that selects the value from register 42. Encoder 30 sends the value from multiplexer 40 out an output 44 onto address bus 16. Thus if the target address is sequential, encoder 30 freezes the value on address bus 16.

If the target address is not sequential, encoder 30 determines the address to send based upon the values for the target address and the previous sent address. To make this selection, encoder 30 includes a comparator 46 that compares between the target address received at input 32 and the previous sent address maintained within register 42. This comparison identifies the special circumstance that may be encountered by encoder 30 when the target address is equal to the address value frozen on address bus 16. The result from comparator 46 controls the output of a multiplexer 48, which selects between the target address and the sequential address generated by register 36 and adder 38. If the target address and the previous coded address are not equal, comparator 46 instructs multiplexer 48 to select the target address. If the target address and the previous coded address are equal, multiplexer 48 selects the sequential address generated by register 36 and adder 38. Thus encoder 30 implements the three states providing an irredundant encoding scheme for addresses communicated on address bus 16.

To further reduce switching activity on address bus 16, encoder 30 may also include coding logic 50 that encodes values communicated on address bus 16. For example, coding logic 50 may implement some or all of the other techniques described above, such as offset encoding, code books, sign/magnitude encoding, bit inversion, and/or transition signaling. Thus, so long as encoder 20 maps numbers such that no two numbers map to the same value, the disclosed techniques may be combined as appropriate and can provide additive benefits for coding target addresses.

Figure 3:
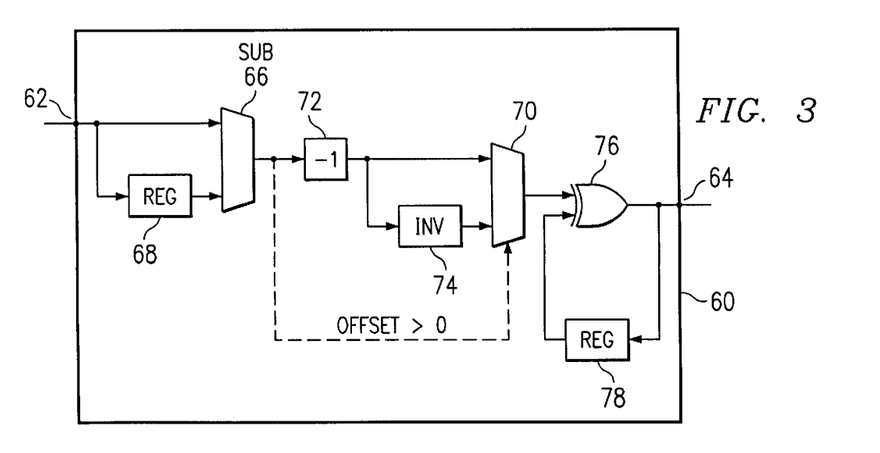
FIG. 3 is a block diagram illustrating a circuit for reducing switching activity on a bus using offset encoding, reduction in binary ones frequency, and transition signaling.

FIG. 3 is a circuit diagram illustrating an encoder 60 that receives a target address using an input 62 and generates a coded address at an output 64. Encoder 60 generates coded addresses using offset encoding, inversion of bits within negative numbers, and transition signaling. Encoder 60 receives a target address at input 62 and generates an offset using a subtractor 66 to subtract the previous target value, as stored within a register 68, from the current target address. So that sequential addresses result in no changes to address bus 16, encoder 60 decrements the offset value by one using a subtractor 72.

Encoder 60 then selects between one of two values based upon whether the offset is greater than zero. If the offset is greater than zero, a multiplexer 70 selects the value directly from subtractor 72. If the offset is not greater than zero, multiplexer 70 selects the output from inversion logic 74, which inverts the least significant bits of the determined offset. That is, as previously discussed, inversion logic 74 inverts the value for all bits within the offset except for the most significant bit. Multiplexer 70 provides the selected output to an exclusive-or module 76.

Exclusive-or module 76 performs an exclusive-or operation between the output from multiplexer 70 and the previous coded addresses, as stored within a register 78, to implement transition signaling. Exclusive-or module 76 provides the result at output 64 and for storage within register 78 for computation of the next address. Thus encoder 60 provides the coded address at output 64 for communication on address bus 16.

Figure 4:
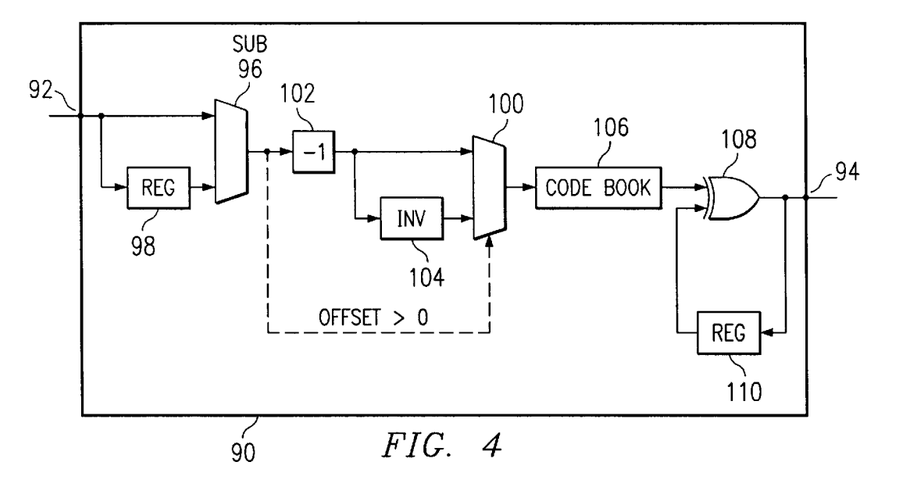
FIG. 4 is a block diagram illustrating a circuit for reducing switching activity on a bus using offset encoding, reduction in binary ones frequency, code book mapping, and transition signaling.

FIG. 4 is a circuit diagram illustrating an encoder 90 that operates on a target address received at an input 92 to generate a coded address at an output 94. Similar to encoder 60, encoder 90 performs offset encoding, bit inversion within negative numbers, and transition signaling. In addition to these operations, encoder 90 also provides for encoding of offsets using a code book.

Encoder 90 determines an offset between a target address received at input 92 and the previous target address using a subtractor 96 to subtract the previous target address, as stored within a register 98, from the target value received at input 92. So that sequential addresses result in no changes to address bus 16, encoder 90 decrements the offset value by one using a subtractor 102. A multiplexer 100 then selects between two values based upon whether the determined offset is greater than zero. If the offset is greater than zero, multiplexer 100 selects the value directly from subtractor 102. If the offset is not greater than zero, multiplexer 100 selects output from inversion logic 104. As with the operation within encoder 60, inversion logic 104 within encoder 90 inverts the least significant bits of the offset to reduce the probability within ones within negative numbers.

Multiplexer 100 provides the selected output to a code book 106. Code book 106 provides a mapping between input values and output values, with this mapping designed to reduce switching activity on address bus 16 over time. As previously discussed, code book 106 may use any suitable techniques and map any number of bits within received inputs. For example, if most offsets fall within a range of numbers that may be represented using a 10-bit binary number, code book 106 may perform mappings on only the ten least significant bits of determined offsets.

Code book 106 provides the coded offset to an exclusive-or module 108. Exclusive-or module 108 performs an exclusive-or operation between the coded offset and the previous coded address, as stored within a register 110, and provides the result of this exclusive-or operation at output 94 for communication on address bus 16 as the coded address. Exclusive-or module 108 also provides the coded address to register 110 for use in determining the next coded address. Therefore, encoder 90 provides coding of target addresses using offset encoding, reduction in ones frequency, code book mapping, and transition signaling.

Figure 5:
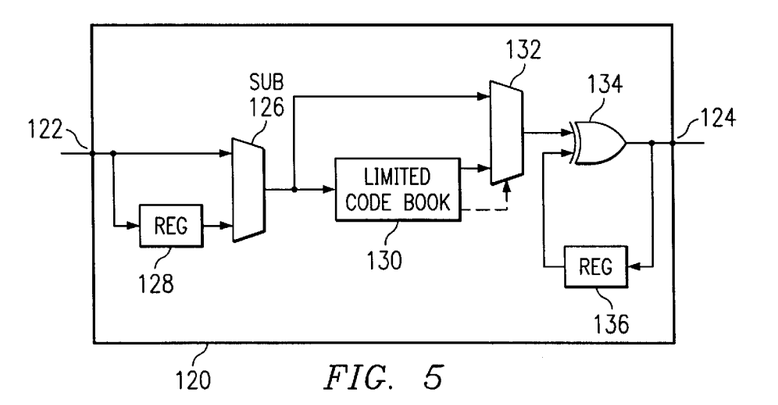
FIG. 5 is a block diagram illustrating a circuit implementing an irredundant encoder having a limited code book.

FIG. 5 is a circuit diagram illustrating exemplary logic for an encoder 120 that receives a target address at an input 122 and generates a coded address at an output 124. Encoder 120 generates the coded address using an offset to access a limited code book and provides logic for handling code book "misses." That is, the limited code book within encoder 120 is an n-bit code book that provides mapping for fewer than all values representable using an n-bit binary number.

Encoder 120 receives a target address and determines the offset from a previous target address using a subtractor 126 to subtract the previous target address, as stored within a register 128, from the target address received at input 122. Encoder 120 then accesses a limited code book 130 using the determined offset. As previously discussed, limited code book 130 provides a mapping for any number of the bits of the determined offset but does not provide a complete mapping for all potential values of those bits. Upon receiving an offset as input, code book 130 determines whether the offset matches to an offset entry and, if so, selects the corresponding code. If the offset does not match to an offset entry, code book 130 determines whether the offset matches to one of the codes. If so, code book 130 selects the corresponding offset entry. Code book 130 provides the selected value as input to a multiplexer 132 and also provides a control signal to multiplexer 132. The control signal indicates whether the offset "hit" either one of the offset entries or one of the code entries within code book 130. If there was a hit within code book 130, multiplexer 132 selects the output from code book 130. If the offset did not hit within code book 130, multiplexer 132 selects the offset. Multiplexer 132 provides the selected value to an exclusive-or module 134.

Exclusive-or module 134 performs an exclusive-or operation between the input received from multiplexer 132 and the previous coded address, as stored within a register 136. Exclusive-or module 134 provides the result of this operation as the coded address at output 124 for sending on address bus 16. Exclusive-or module 134 also provides the coded address to register 136 for use in determining the next coded address value. Thus encoder 120 provides for irredundant encoding of target addresses using a limited code book.

The preceding illustrations and accompanying descriptions provide exemplary circuit diagrams for implementing various encoding schemes. However, these figures are merely illustrative, and system 10 contemplates using any suitable combination and arrangement of elements for implementing various encoding schemes. Thus, these encoders may include any suitable combination and arrangement of elements for processing target addresses to generate coded addresses for communication on address bus 16, with the coded addresses designed to reduce switching activity over time. Moreover, the operations of the various illustrated encoders may be combined and/or separated as appropriate. For example, as previously discussed, encoder 30 may include coding logic 50 that implements some or all of the coding schemes used within encoder 60, encoder 90, and encoder 120.

Figures 6, 7:
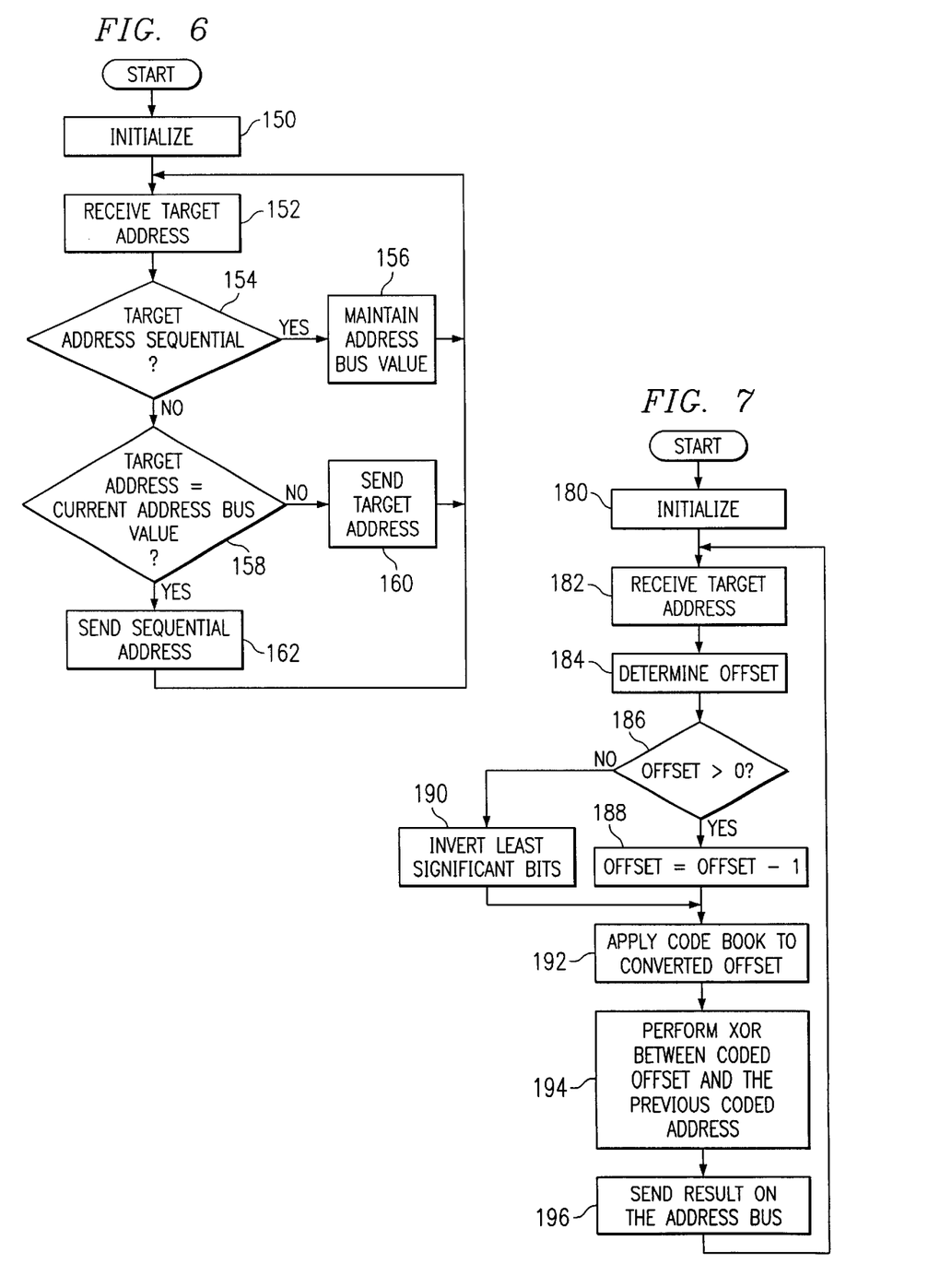
FIG. 6 is a flowchart illustrating a method for irredundant encoding of bus signals.
FIG. 7 is a flowchart illustrating a method for reducing switching activity on a bus using offset encoding, reduction in binary ones frequency, code book mapping, and transition signaling.

FIG. 6 is a flowchart illustrating a method for irredundant encoding of target addresses that leverages the sequential nature of these received target addresses by freezing address bus 16 at appropriate times. As previously discussed, this method provides for three modes of operation, a first given sequential target addresses, a second given a target address equal to a value on address bus 16, and a third given all other cases. The following description focuses on the operation of encoder 30, since this circuit diagram illustrates functional elements that provide for this encoding scheme. However, as noted, system 10 contemplates using any suitable combination and arrangement of functional elements for providing these operations, and these techniques can be combined with other techniques as appropriate.

Encoder 30 initializes at step 150. For example, encoder 30 may initialize the values of register 36 and register 42. Encoder 30 receives a target address at step 152 and determines whether the target address is sequential at step 154. For example, using comparator 34, encoder 30 may determine whether the received target address is sequential when compared to the previously received target address. If the target address is sequential, encoder 30 maintains the value on address bus 16 at step 156. Thus so long as received target addresses remain sequential, encoder 20 will institute no switching activity on address bus 16.

If the target address is not sequential, encoder 30 determines whether the target address is equal to the current address bus value at step 158. For example, encoder 30 may compare the received target address with a previous coded address stored within register 42. If the target address and the previous coded address are not equal, encoder 30 sends the target address as the coded address at step 160. If the target address is equal to the previous coded address, encoder 30 sends the sequential address as the coded address at step 162. For example, encoder may select to send the previous target address maintained within register 36 incremented by adder 38, thus indicating to decoder 22 the special circumstance where the target address is equal to the current address encoded on address bus 16. This process repeats for each received target address, with encoder 30 selecting from the three modes of operation based upon the procedure described above.

FIG. 7 is a flowchart illustrating a method for encoding a target address into a coded address using offset encoding, reduction in the probability of one, a code book, and transition signaling. As this flowchart details a process similar to that implemented by encoder 90, the following discussion will focus on the operation of encoder 90. However, as with the previous flowchart, system 10 contemplates using any suitable elements and/or logic to implement similar functionality.

Encoder 90 initializes at step 180. For example, encoder 90 may set initial values within register 98 and register 110. Encoder 90 receives a target address at step 182 and determines an offset from a previous target address at step 184. For example, using subtractor 96, encoder 90 may determine the offset between the target address received at input 92 and the previous target address maintained within register 98.

Encoder 90 determines whether the offset is greater than zero at step 186. If so, encoder 90 converts the offset by subtracting one at step 188. If the offset is not greater than zero, encoder 90 converts the offset by inverting least significant bits of the offset at step 190. Encoder 90 applies a code book to the converted offset at step 192. Encoder 90 then performs an exclusive-or operation between the coded offset generated from the code book and the previous coded address communicated on address bus 16, performing this operation at step 194. Encoder 90 sends the result of the exclusive-or operation on address bus 16 at step 196. This combination of operations will, in many circumstances, result in reduced switching activity, thus providing lower power consumption for circuits implementing these techniques.

Figures 8, 9:
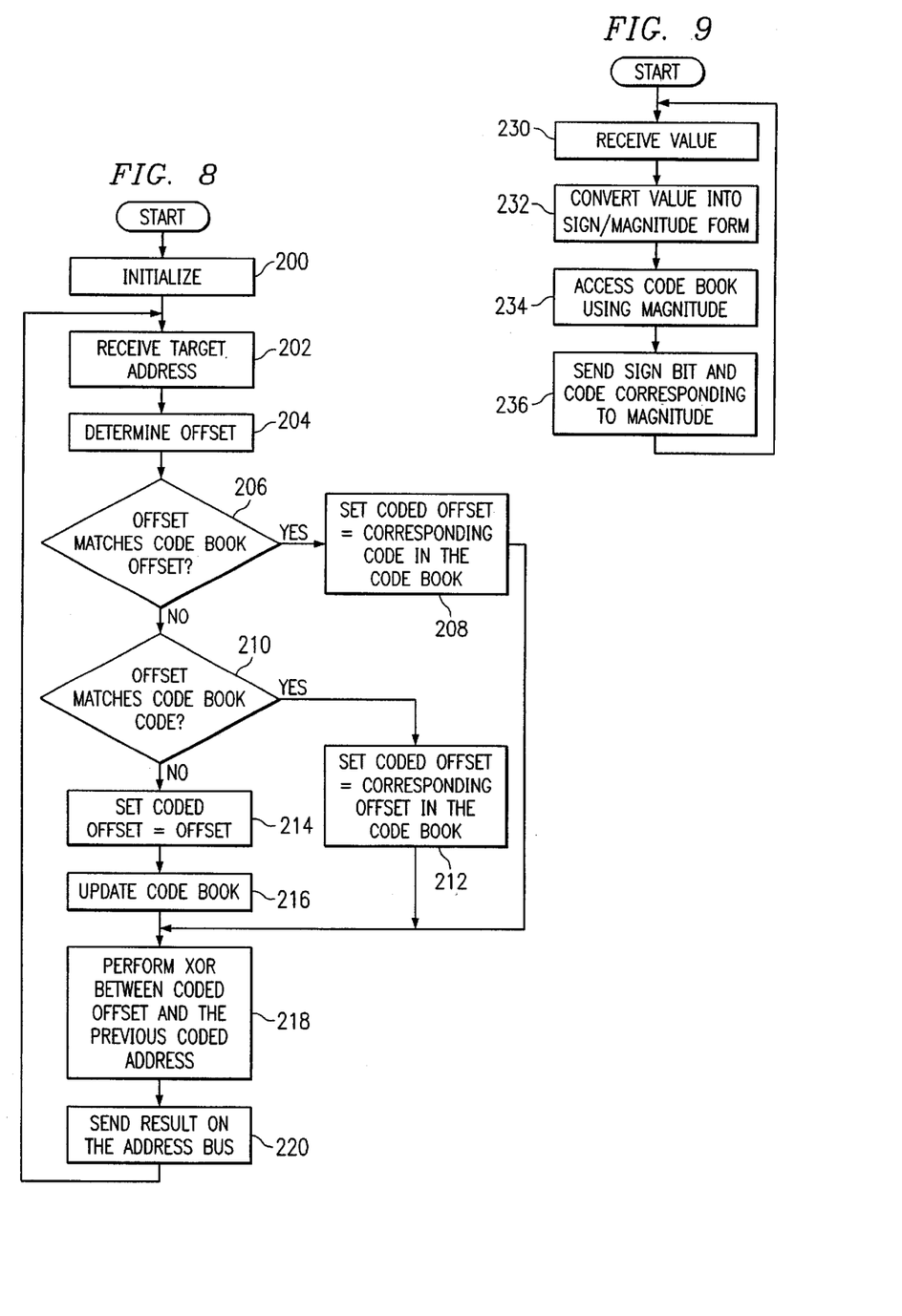
FIG. 8 is a flowchart illustrating a method for irredundant encoding of addresses using a limited code book to reduce switching activity on a bus.
FIG. 9 is a flowchart illustrating a method for reducing code book sizes.

FIG. 8 is a flowchart illustrating a method for encoding a target address into a coded address using an adaptable, limited code book. Because this method operates similar to the functioning of encoder 120, the following description will focus on the operation of encoder 120 in performing this method. However, as with the previous flowcharts system 10 contemplates using any appropriate combination and arrangement of logical elements implementing some of all of the described functionality.

Encoder 120 initializes at step 200. For example, encoder 120 may set initial values for register 128 and register 136. Encoder 120 may further set initial values within limited code book 130. According to particular embodiments, encoder 120 may initialize limited code book 130 to reflect offsets that commonly occur or to initially include no mappings. After initialization, encoder 120 processes received target addresses.

Encoder 120 receives a target address at step 202 and determines the offset between a previously received target address at step 204. For example, using subtractor 126, encoder 120 may determine the difference between the received target address and the previous target address value maintained within register 128. If the offset matches an offset entry within the limited code book at step 206, encoder 120 sets the coded offset value equal to the corresponding code in the code book at step 208. For example, limited code book 130 may output the value for the corresponding code in the code book and instruct multiplexer 132 to select this output.

If the offset does not match an offset entry within the code book, encoder 120 determines whether the offset matches a code entry within the code book at step 210. If there is a match, encoder 120 sets the coded offset value equal to the corresponding offset entry in the code book at step 212. For example, limited code book 130, upon detecting a match, may output the corresponding offset entry and instruct multiplexer 132 to select the output provided from limited code book 130.

If the offset does not match any of the offset entries or code entries within the limited code book, encoder 120 sets the coded offset value equal to the offset at step 214. For example, if the offset misses all offset entries and code entries, limited code book 130 instructs multiplexer 132 to select the target address received by encoder 120. In addition, encoder 120 may update the code book at step 216. For example, any offset that misses within the limited code book may replace the least used offset entry within the limited code book. However, as previously discussed, encoder 120 may use any suitable technique for adapting the contents of the limited code book. Moreover, the method need not use an adaptable code book.

Encoder 120 performs an exclusive-or operation between the coded offset and the previous coded offset at step 218 and sends the result on address bus 16 at step 220. Thus, the method selects the coded offset based upon whether a determined offset hits within the limited code book. In addition, the limited code book selects the appropriate coded offset depending upon whether the hit occurs because of a match between the offset and an offset entry or between the offset and a code entry within the limited code book. This method permits the use of a limited code book without the addition of extra control or communication lines.

FIG. 9 is a flowchart illustrating a method for mapping values within a code book to reduce the code book size. This method implements the mapping of number complements to single code book entries in order to have the size of the code book in use. Specifically, the method described uses coding logic that operates upon numbers received in two's complement form and using a code book mapping the magnitudes of values in sign/magnitude form. Coding logic receives an uncoded value at step 230 and converts the value into sign/magnitude form at step 232. The logic then accesses a code book using the magnitude at step 234. The logic outputs the sign bit and the code book value corresponding to the magnitude at step 236. Using this technique, the size of the code book in use is reduced by a factor of two, since each pair of compliments matches to a single entry within the code book. However, while illustrated and described as operating upon a value converted into sign/magnitude form, system 10 contemplates encoder 20 using any suitable technique for mapping compliments to a single code value within a code book.

The preceding flowcharts and accompanying descriptions illustrate exemplary methods of operation for encoding target addresses into coded addresses using various encoding schemes. However, these methods are merely illustrative, and system 10 contemplates encoder 20 implementing any suitable techniques for encoding target addresses using some or all of the disclosed methods. Thus, any or all of these techniques may be used separately and/or together as appropriate to reduce switching activity on address bus 16. Moreover, because the flowcharts and descriptions are only illustrative, system 10 contemplates encoder 20 using methods with additional tens fewer steps, and/or different steps, so long as the methods remain appropriate. In addition, while not explicitly illustrated, the operation and arrangement of elements within decoder 22 will depend upon the particular techniques implemented within encoder 20. That is, decoder 22 will function to reverse the encoding performed by encoder 20. Therefore, system 10 contemplates decoder 22 having any suitable combination and arrangement of hardware and/or controlling logic that operates to decode coded addresses from address bus 16 based upon the operations performed within an encoder 20.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for reducing switching activity on a bus, the method comprising:

maintaining a current value on an address bus if a target address is equal to a previous target address incremented by a constant;

sending the target address on the address bus if the target address is not equal to the previous target address incremented by the constant and if the target address is not equal to the current value on the address bus; and sending the sum of the previous target address plus the constant on the address bus if the target address is equal to the current value on the address bus.

2. The method of claim 1, further comprising:
receiving a requested address from a device; and
determining an offset between the requested address and a previous requested address from the device, wherein the target address is equal to the offset, and the previous target address is equal to a previously determined offset.

3. The method of claim 1, further comprising:
receiving a requested address from a device;
determining an offset between the requested address and a previous requested address from the device; and
converting the offset into a coded offset using a code book, wherein the target address is equal to the coded offset.

4. The method of claim 1, wherein sending a value on the address bus comprises:
performing an exclusive-or operation between the value and the current value on the address bus; and
sending a result of the exclusive-or operation on the address bus.

5. A method for reducing switching activity on a bus, the method comprising:
receiving a target address for communication to a memory on an address bus;
determining an offset between the target address and a previous target address;
inverting selected bits of the offset if the offset is negative;
performing an exclusive-or operation between the offset and a previous coded offset sent on the address bus; and
sending a result of the exclusive-or operation on the address bus.

6. The method of claim 5, further comprising subtracting a constant from the offset.

7. The method of claim 5, further comprising converting the offset into a coded offset using a code book, the code book mapping a plurality of offset entries to a plurality of code entries.

8. The method of claim 5, wherein inverting the selected bits of the offset comprises inverting all bits of the offset except for the most significant bit of the offset.

9. The method of claim 5, wherein inverting the selected bits of the offset comprises converting the offset from two's complement form into sign/magnitude form.

10. The method of claim 9, wherein converting the offset comprises accessing a code book using a magnitude of the offset to determine the coded offset, the code book mapping a plurality of magnitudes to a plurality of code entries.

11. A method for encoding values to reduce switching activity on a bus, the method comprising:
receiving an address value;
accessing a limited code book using the address value, the limited code book mapping a plurality of address entries into a plurality of code entries;
if the address value matches one of the address entries, setting a coded address value equal to the one of the code entries corresponding to the matching address entry;
if the address value matches one of the code entries, setting the coded address value equal to the one of the address entries corresponding to the matching code entry;
if the address value fails to match one of the address entries or one of the code entries, setting the coded address value equal to the address value; and
sending the coded address on an address bus.

12. The method of claim 11, further comprising:
receiving a target address;
determining an offset between the target address and a previous target address; and
using the offset as the address value for accessing the code book.

13. The method of claim 11, wherein sending the coded address on the address bus comprises:
performing an exclusive-or operation between the coded offset and a previous coded offset sent on the address bus; and
sending a result of the exclusive-or operation on the address bus.

14. The method of claim 11, wherein the code entries comprise limited weight codes having fewer ones in binary notation than corresponding offset entries.

15. The method of claim 11, further comprising, if the address value fails to match one of the address entries or one of the code entries:
selecting one of the address entries; and
replacing the selected address entry with the address value, such that the next occurrence of the address value will match in the limited code book.

16. An encoder comprising:
an input operable to receive a target address;
an output coupled to an address bus;
a first memory element maintaining a previous target address received at the input;
a second memory element maintaining a previous coded address sent on the address bus;
a selection module operable to provide the previous coded address to the output if the target address is equal to the previous target address incremented by a constant, to provide the target address to the output if the target address is not equal to the previous target address incremented by the constant and if the target address is not equal to the previous coded address, and to provide the sum of the previous target address plus the constant to the output if the target address is equal to the previous coded address.

17. The encoder of claim 16, further comprising:
an initial input operable to receive a requested address; and
coding logic coupled between the initial input and the input, the coding logic operable to determine an offset between the requested address and a previous requested address and to provide the offset to the input as the target address.

18. The encoder of claim 16, further comprising:
an initial input operable to receive a requested address; and
coding logic coupled between the initial input and the input, the coding logic operable to determine an offset between the requested address and a previous requested address, to convert the offset into a coded offset using a code book and to provide the coded offset to the input as the target address.

19. The encoder of claim 16, further comprising an exclusive-or module coupled between the selection module and the output, the exclusive-or module operable to perform a value provided from the selection module and the previous coded address and to provide a result of the exclusive-or operation to the output.

20. An encoder comprising:

an input operable to receive a target address;

an output coupled to an address bus;

a first memory element maintaining a previous target address received at the input;

a second memory element maintaining a previous coded address sent on the address bus;

an offset module operable to determine an offset between the target address and the previous target address;

coding logic operable to invert selected bits of the offset if the offset is negative; and an exclusive-or module operable to perform an exclusive-or operation between the offset and the previous coded address and to provide a result of the exclusive-or operation to the output.

21. The encoder of claim 20, wherein the coding logic is further operable to subtract a constant from the offset.

22. The encoder of claim 20, wherein the coding logic is further operable to invert all bits of the offset except for the most significant bit of the offset if the offset is negative.

23. The encoder of claim 20, further comprising:

a code book mapping a plurality of offset entries to a plurality of code entries; and wherein the coding logic is further operable to convert the offset into a coded offset using the code book.

24. The encoder of claim 20, wherein the coding logic is further operable to convert the offset comprises from two's complement form into sign/magnitude form.

25. The encoder of claim 24, wherein the coding logic is further operable to access a code book using a magnitude of the offset to determine a coded offset.

26. An encoder comprising:

a limited code book mapping a plurality of address entries into a plurality of code entries, the limited code book operable to receive an address value, to output a corresponding one of the code entries if the address value matches one of the address entries, to output a corresponding one of the address entries if the address value matches one of the code entries, and to generate a control signal indicating if the address value fails to match one of the offset entries or one of the code entries;

a selection module operable to receive the address value, the output from the limited code book, and the control signal, the selection module further operable to select the address value if the control signal indicates a failure to match and to select the output of the limited code book if the control signal indicates a match.

27. The encoder of claim 26, further comprising:

an input operable to receive a target address;

a first memory element maintaining a previous target address received at the input; and an offset module operable to determine an offset between the target address and the previous target address and to provide the offset to the limited code book and the selection module as the address value.

28. The encoder of claim 27, further comprising:

an output coupled to an address bus;

a second memory element maintaining a previous coded address sent on the address bus; and an exclusive-or module operable to receive the selection from the selection module, to perform an exclusive-or operation between the received selection and the previous coded address, and to provide a result of the exclusive-or operation to the output.

29. The encoder of claim 27, wherein the code entries comprise limited weight codes having fewer ones in binary notation than corresponding address entries.

30. The encoder of claim 27, wherein the limited code book is further operable, if the address value fails to match one of the address entries or one of the code entries:

to select one of the address entries; and to replace the selected address entry with the address value, such that the next occurrence of the address value will match in the limited code book.

* * * * *

UNITED STATES PATENT AND TRADEMARK OFFICE
CERTIFICATE OF CORRECTION

PATENT NO. : 6,813,700 B2
DATED : November 2, 2004
INVENTOR(S) : Fallah et al.

It is certified that error appears in the above-identified patent and that said Letters Patent is hereby corrected as shown below:

<u>Title page,</u>
Item [73], Assignee, should read -- Fujitsu Limited and University of Southern California --

Signed and Sealed this

Fifth Day of July, 2005

JON W. DUDAS
*Director of the United States Patent and Trademark Office*

UNITED STATES PATENT AND TRADEMARK OFFICE
CERTIFICATE OF CORRECTION

PATENT NO. : 6,813,700 B2
DATED : November 2, 2004
INVENTOR(S) : Farzan Fallah et al.

It is certified that error appears in the above-identified patent and that said Letters Patent is hereby corrected as shown below:

Column 1,
Line 10, delete "which is hereby incorporated by reference" and insert -- and U.S. Provisional Patent Application Serial No. 60/298,233 filed June 13, 2001, entitled *Method and Apparatus for Bus Encoding*. --.

Column 12,
Line 36, after "additional", delete "tens" and insert -- steps, --.

Signed and Sealed this

Thirteenth Day of June, 2006

JON W. DUDAS
*Director of the United States Patent and Trademark Office*